United States Patent [19]

Wachter

[11] Patent Number: 4,666,660
[45] Date of Patent: May 19, 1987

[54] METHOD AND APPARATUS FOR INCREASING LOAD-BEARING CAPACITY OF WATER POOLS FOR STORING SPENT NUCLEAR FUEL RODS

[75] Inventor: William J. Wachter, Wexford, Pa.

[73] Assignee: U.S. Tool & Die, Inc., Allison Park, Pa.

[21] Appl. No.: 660,477

[22] Filed: Dec. 7, 1984

Related U.S. Application Data

[63] Continuation of Ser. No. 312,243, Oct. 19, 1981, abandoned.

[51] Int. Cl.⁴ ............................................. G21C 19/32
[52] U.S. Cl. ..................................................... 376/272
[58] Field of Search ................ 376/272, 251; 114/313, 114/123; 441/1, 21, 23, 28

[56] References Cited

U.S. PATENT DOCUMENTS

| | | | |
|---|---|---|---|
| 3,952,349 | 4/1976 | Erath et al. | 114/16 E X |
| 4,029,968 | 6/1977 | Rubinstein et al. | 376/272 |
| 4,069,923 | 1/1978 | Blumenau et al. | 376/272 X |
| 4,287,426 | 9/1981 | Anthony | 376/272 X |
| 4,318,492 | 3/1982 | Peehs et al. | 376/272 X |
| 4,336,103 | 6/1982 | Katscher et al. | 376/245 |

OTHER PUBLICATIONS

"Preliminary Experimental Investigation of a Spent Fuel Storage Rack Dynamic Absorber", U S. Tool and Die Co., 11/81.

Primary Examiner—Deborah L. Kyle
Assistant Examiner—Dan Wasil
Attorney, Agent, or Firm—Thomas H. Murray; Clifford A. Poff

[57] ABSTRACT

Submerged canisters containing compacted spent nuclear fuel rods are connected to buoyant spacer boxes to reduce the apparent weight of the canisters whereby additional canisters may be introduced into existing water pools without exceeding the load-carrying capacity of the water pool floors. The spacer boxes may be integral with the canisters or may be distinct. The spacer boxes may be rigidly or flaccidly connected to the spacer boxes. Buoyancy in the spacer boxes is preferably achieved by filling them with gas, preferably air.

17 Claims, 11 Drawing Figures

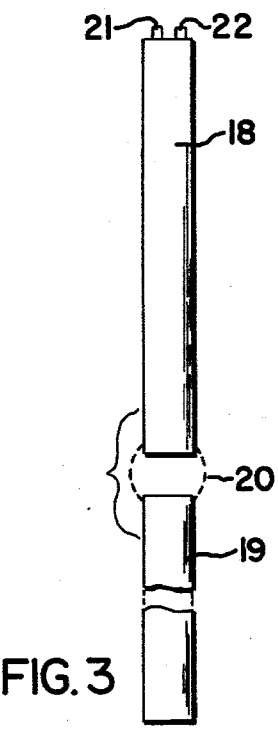
FIG. 3
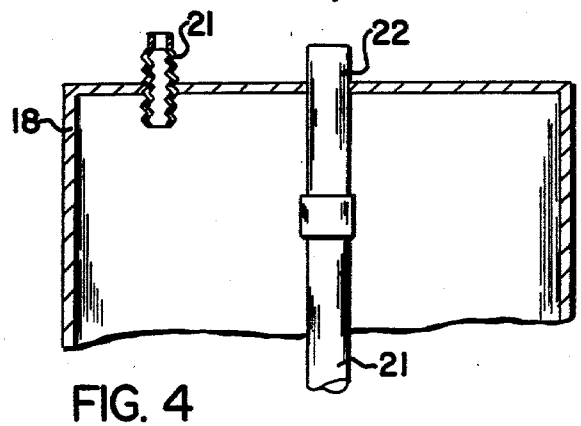
FIG. 4
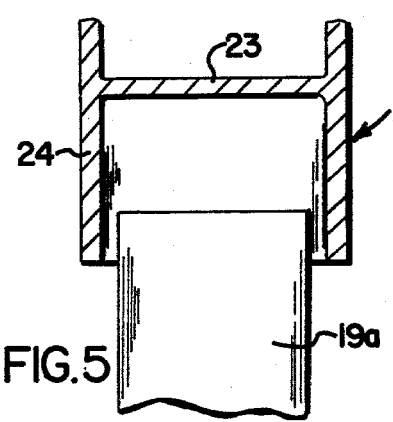
FIG. 5
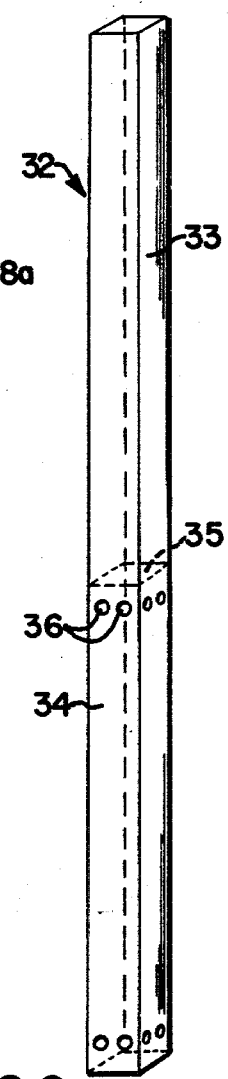
FIG. 9
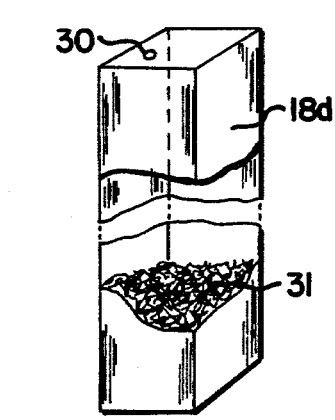
FIG. 8
FIG. 6
FIG. 7

METHOD AND APPARATUS FOR INCREASING LOAD-BEARING CAPACITY OF WATER POOLS FOR STORING SPENT NUCLEAR FUEL RODS

This is a continuation of co-pending application Ser. No. 312,243 filed on Oct. 19, 1981 now abandoned.

BACKGROUND OF THE INVENTION

1. Field of the Invention:

This invention relates to a method and apparatus for increasing the storage capacity of a water pool for storing spent nuclear fuel rods.

2. Description of the Prior Art:

Spent nuclear fuel rods from nuclear reactors are normally stored in deep water pools in storage racks for sufficient periods to permit the residual reactivity of the nuclear fuel to dissipate or until the spent fuel rods are withdrawn from the pool for transportation to a spent fuel recovery installation. Typical fuel rods are individual cylinders of about ½ inch diameter and about 8 feet long which are confined within a fuel rod assembly while they are in a nuclear reactor and subsequently while they are stored in a deep water storage pool. It is a normal practice to provide spaces between the spent fuel rod assemblies to preclude any unintended temperature increase within the water storage pool. When a water storage pool has its alternate storage rack positions filled with spent fuel rod assemblies there is no space remaining within the deep water pool for additional assemblies of spent nuclear fuel rods.

It has been proposed to withdraw the spent fuel rods from the assembly in which they have a normal spacing and to compact the spent fuel rods in a canister in which the fuel rods are compacted in tighter spacing. The more compact spent nuclear fuel rods do not present the same tendency for temperature increase and can be stored in adjacent and contiguous spaces in a storage rack, thereby increasing the storage capacity of an existing storage rack threefold. See copending U.S. patent application Ser. No. 291,230 filed on Aug. 10, 1981 by W. J. Wachter.

A serious consequence of increasing the storage capacity of existing storage racks in deep water pools is that the floor (usually concrete) of such deep water pools may have its loading capacity exceeded by such increased storage. It is essential to maintain the spent fuel rods under at least 10 feet of water at all times, including those times when the spent fuel rods are being transferred from their fuel rod assemblies into a compacted fuel rod canister. Accordingly, typical water storage pools are about 45 feet deep and contain metal storage racks at their base. The fuel container storage racks have a height which corresponds approximately to the length of the nuclear fuel rod assemblies, typically 12 feet or 15 feet. The anticipated floor loading, thus, is the weight of the 45 feet deep water pool and the contained storage rack and spent fuel rod containers. The increased load of fuel rods resulting from compaction and consolidation of the fuel rods into containers utilizing all of the spaces in the storage rack will significantly increase the bearing load applied to the floor of the deep water pool. The cost savings achieved from the threefold increase in storage capacity for spent nuclear fuel rods cannot be permitted to jeopardize the structural integrity of the water pool floor.

STATEMENT OF THE INVENTION

It is an object of the invention to provide a method and apparatus for reducing the load which is applied to the floor of a deep water pool for spent nuclear fuel rod storage.

According to the invention, a long, narrow, enclosed spacer box is provided in the water pool above the stored spent fuel rods. In one embodiment, the spacer box is provided above each of the spaces or above a small group of the spaces of a rack for nuclear fuel rod storage assemblies or canisters. In another embodiment, a spacer box is provided above perimeter space or above reserved space in which fuel handling apparatus is located. The enclosed spacer box is filled with gas, such as air, and is connected at its bottom to a nuclear fuel rod canister or to the storage rack or directly to a frame which is secured to the base of the water storage pool. The enclosed spacer box may be filled with lightweight fillers such as plastic foam, preferably closed cell plastic foam, or with glass or plastic spheres. The enclosed spacer box functions as a flotation device to displace its volume of water from the water storage pool and thereby to reduce substantially the deadweight loading applied to the floor of the deep water storage pool. This is accomplished without interfering with the required shielding water layer at the top of the deep water storage pool.

In one embodiment the enclosed spacer box is provided with a gas inlet and a water outlet. The enclosed spacer box is initially filled with clear water to facilitate the positioning of the enclosed spacer box within the water pool. After the enclosed spacer box has been positioned and secured as hereinafter described, gas, such as air, is introduced through the gas inlet to displace the water from the enclosed spacer box through the water outlet into the deep water pool. Thereafter the gas inlet and water outlet are closed and the enclosed spacer box remains filled with gas.

The bottom of the enclosed spacer box is provided with appropriate geometry to correspond to one subjacent storage space or a cluster of subjacent storage spaces in the storage rack. In one embodiment the hollow spacer box is distinct from the canister and has a skirt which fits as a cap over the top of one spent nuclear fuel canister. Appropriate connection devices between the skirt and the canister are provided, e.g., bayonet connections or other reversible connection devices. The enclosed spacer box may have a flaccid connection to a subjacent canister or cluster of canisters in the form of a short cable or chain connection, a ball-and-socket joint or a handle-and-hook connection. Alternatively, the enclosed spacer box may be connected directly to the storage rack itself. As a still further embodiment the enclosed spacer box may be connected to a frame which is secured to the base of the deep water storage pool. The frame may be anchored in the floor of the pool or in the side walls of the pool adjacent to the floor. This embodiment is particularly advantageous with spacer boxes which are mounted above perimeter space or above reserved space in the pool.

In yet another embodiment, the spacer box and the canister may be provided in a common storage unit which includes an upper chamber which comprises the spacer box and a bottom chamber which comprises the canister for the spent nuclear fuel rods. The volume of the upper chamber is at least half the volume of the bottom chamber in order to provide adequate buoyancy. The spacer box buoyancy must not be so great that the submerged fuel rods will be drawn upwardly in the water pool.

BRIEF DESCRIPTION OF THE DRAWINGS

FIG. 3 is a side elevation view of an enclosed spacer box according to this invention and a subjacent canister for spent nuclear fuel rods.

FIG. 4 is a fragmentary cross-section illustration of the upper end of an enclosed spacer box of FIG. 3.

FIGS. 5, 6, 7 are side elevation views, partly in cross-section, showing the bottom end of an enclosed spacer box and the top end of a canister for spent nuclear fuel rods.

FIG. 8 is a broken perspective illustration of an enclosed spacer box according to an alternative embodiment of the invention.

FIG. 9 is a perspective illustration of a unitary storage unit including both a spacer box and a canister.

DESCRIPTION OF THE PREFERRED EMBODIMENTS

Figure 1:
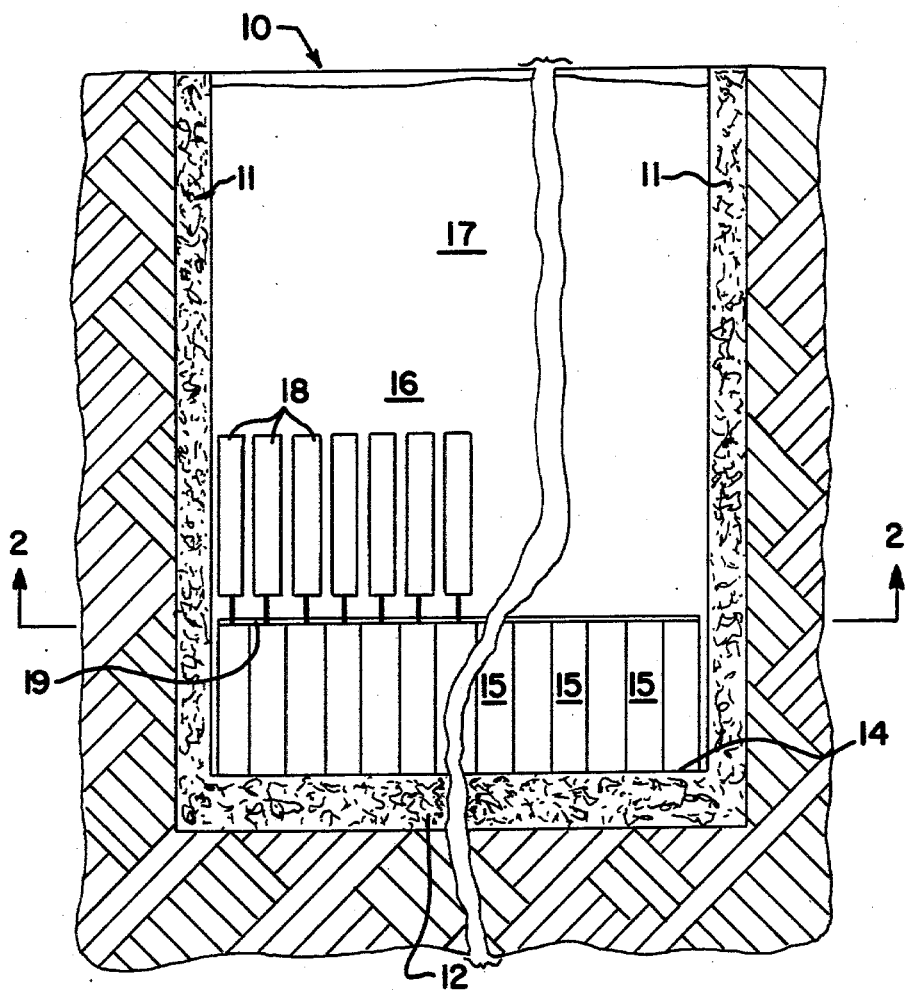
FIG. 1 is a cross-section view of a deep water pool for the storage of spent nuclear fuel rods.
Figure 2:
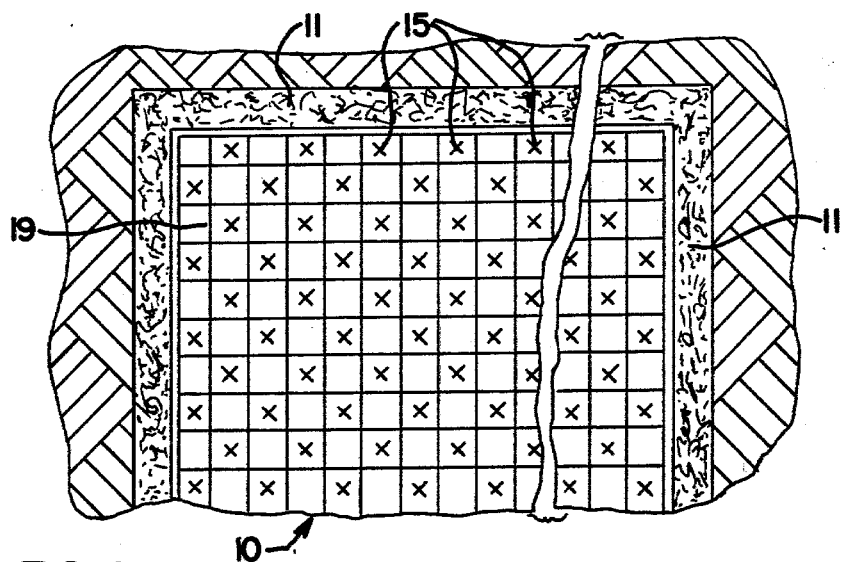
FIG. 2 is a cross-section view taken along the line 2—2 of FIG. 1 illustrating a nuclear fuel rod storage rack which is positioned at the base of the deep water storage pool.

As illustrated in FIG. 1 a typical deep water storage pool 10 for spent nuclear fuel rods includes side walls 11 and a floor 12. The side walls 11 and floor 12 are customarily fabricated from reinforced concrete and combine to define a water enclosure having an upper level 17 and a floor or bottom 14 filled with water 16. Positioned within the deep water storage pool 10 is a storage rack 15 for spent nuclear fuel rod containers. Typically the fuel rods and containers are 12 or 15 feet long. The height of the storage rack 15 correspondingly is about 12 or 15 feet. The individual storage racks are illustrated in FIG. 2 as a checkerboard arrangement with plural vertical spaces, each of which is adapted to receive one container for nuclear fuel rods. It will be observed in FIG. 2 that the spaces which are marked with an X are alternating spaces (similar to the black spaces on a checkerboard) which are customarily filled with spent nuclear fuel rod assemblies withdrawn from a nuclear fuel reactor. The spent nuclear fuel rod assemblies are retained within the alternate storage spaces until their reactivity has dissipated to a level where they can be compacted into canisters in which the nuclear fuel rods are stored in a greater density. When the spent nuclear fuel rods are confined within canisters in a greater density, the canisters can be introduced into each of the spaces which are shown in FIG. 2, that is, not only the spaces marked with X but also the unmarked spaces. As described in copending U.S. patent application Ser. No. 291,230, supra, it is possible to introduce the spent nuclear fuel rods from two spent nuclear fuel rod assemblies (recovered from a nuclear fuel reactor) into a single canister of about the same cross-sectional dimensions whereby each individual space in the storage rack 15 will receive approximately twice as many spent nuclear fuel rods as appear in a customary nuclear fuel rod assembly. Inasmuch as the spaces can be utilized completely, the storage capacity of compacted nuclear fuel rods is increased by threefold when both compaction and consolidation are practiced. It will be observed, however, from FIG. 1 that the introduction of three times the weight of nuclear fuel rods into the storage rack 15 will greatly increase the load which is applied to the floor 14 of the deep water pool 10. It will be further observed that the floor 14 is required to sustain not only the deadweight load of the storage rack 15 and its contained nuclear fuel rods, but also the weight of the water 16 which is customarily approximately 45 feet deep.

Within the water 16, there is an upper layer thereof at 17 which is required for shielding of the neutrons which may be released. The upper layer at 17 is required to be approximately 10 feet deep.

The present invention provides a group of enclosed spacer boxes 18 which have square or rectangular cross-sections and which are slightly larger than but preferably congruent with a subjacent nuclear fuel storage canister 19 (FIG. 3) or a cluster of canisters. The enclosed spacer box 18 is fabricated from metal, preferably stainless steel, although aluminum alloys or other metals might be considered as materials of construction. In a typical embodiment, the enclosed spacer box 18 is about 8 inches square and 15 to 20 feet long. In another embodiment, the enclosed spacer box might be 16 or 17 inches square covering four contiguous canister spaces. It will be observed in FIG. 3 that dotted lines 20 indicate an undefined connection between the bottom of the enclosed spacer box 18 and the top of the container 19 for spent nuclear fuel rods. Examples of typical connections are illustrated in FIGS. 5, 6, 7 hereinafter. The enclosed spacer box 18 is watertight and therefore can be filled with a gas or other buoyant material in order to provide buoyancy for the non-aqueous load of the water pool floor 14. Specifically, as shown in FIG. 1, the elongated spacer boxes 18 are connected to the spent nuclear fuel rod containers 19 or to the rack 15 or in a further embodiment to a frame (not shown in FIG. 1) which is connected to the bottom wall 12 or the adjacent portion of the side walls 11. In this installation, the enclosed spacer box 18 displaces its volume of water with a corresponding volume of gas or other lightweight buoyant material and thereby reduces the deadweight load on the floor 14 of the water pool 10.

In the embodiment of FIGS. 3 and 4, the spacer box 18 is provided with a gas inlet 21 and a water outlet opening 22 in its upper wall. The enclosed spacer box 18 in this embodiment is filled with clear water before introduction into the water 16. The water-filled spacer box 18 can be easily directed into position within the water 16 and can be secured as desired through the connection members 20 or through connections to the storage rack 15 or to a structural frame (not shown). Thereupon gas is introduced into the spacer box 18 through the gas inlet 21 causing displacement of the clear water from the interior of the enclosed spacer box 18 outwardly through the water outlet 22 into the water 16. After substantially all of the water is displaced upwardly through a withdrawal tube 21, the water outlet 22 is closed, for example, by means of a one-way valve and the air inlet 21 similarly is closed. Thereafter the gas-filled enclosed spacer box 18 functions as a buoyancy member.

A variety of means can be provided for connecting the bottom end of an enclosed spacer box 18 to the top of a container 19 for spent nuclear fuel rods. As shown in FIG. 5, a preferred embodiment provides that the enclosed spacer box 18a have its bottom wall 23 recessed within the ends of the side walls 24 to provide a cap within which the upper end of the container 19a is fitted. Any appropriate mechanical connections between the bottom of the enclosed spacer box 18a and the top of the container 19a can be provided.

In FIG. 6 the container 19b is provided with an upper handle 25 in accordance with a familiar practice in this art. In this embodiment, the bottom end of the enclosed spacer box 18b is equipped with a corresponding hook device 26 which engages the handle 25 and provides for a flaccid connection between the enclosed spacer box 18b and the container 19b.

In FIG. 7, the container 19c similarly has a handle 27. The bottom walls 28 of the enclosed spacer box 18c are provided with bayonet connectors 29 which releasably engage the handle 27 to provide a flaccid connection. Other flaccid connections might be arranged through a stub cable or a chain connecting the enclosed spacer box 18 with the container 19.

The chain or cable may be a short stub unit in which case the spacer box is positioned close to the canister, well below the surface of the water 16. Alternatively, the chain or cable may be long whereby the spacer box is positioned adjacent to but below the surface of the water 16—and preferably below the upper layer 17.

In a further embodiment of the invention as shown in FIG. 8, the enclosed spacer box 18d is provided with an opening 30 in its wall through which foamed-in-place plastic foam 31 may be introduced. Preferably the foam 31 is closed cell foam so that the enclosed spacer box 18d will retain its buoyancy in the event a fracture or leak develops in one of the walls of the enclosed spacer box. In place of the foamed-in-place foam 30, it is possible to introduce preformed bars of organic foam or other lightweight buoyancy material into the enclosed spacer box 18 before it is enclosed. Other buoyancy materials might include glass spheres or plastic spheres if desired.

In a yet further embodiment, shown in FIG. 9, a unitary storage unit 32 includes a common structure having an upper chamber 33 which comprises a spacer box and a bottom chamber 34 which comprises a canister for confining compacted spent nuclear fuel rods. A central plate 35 may be provided to separate the upper chamber 33 from the bottom chamber 34. Apertures 36 may be provided for water circulation through the bottom chamber 34.

Figure 10:
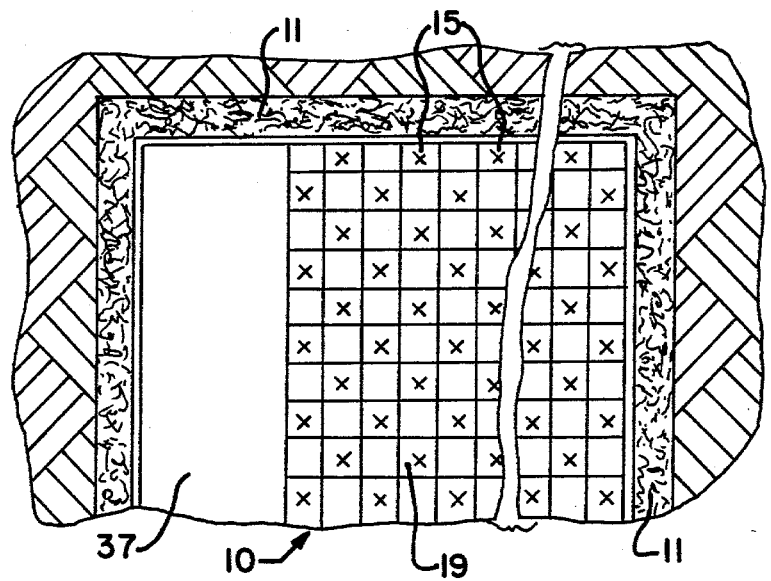
FIG. 10 is a cross-sectional view similar to FIG. 2 showing an alternative fuel rod storage array.
Figure 11:
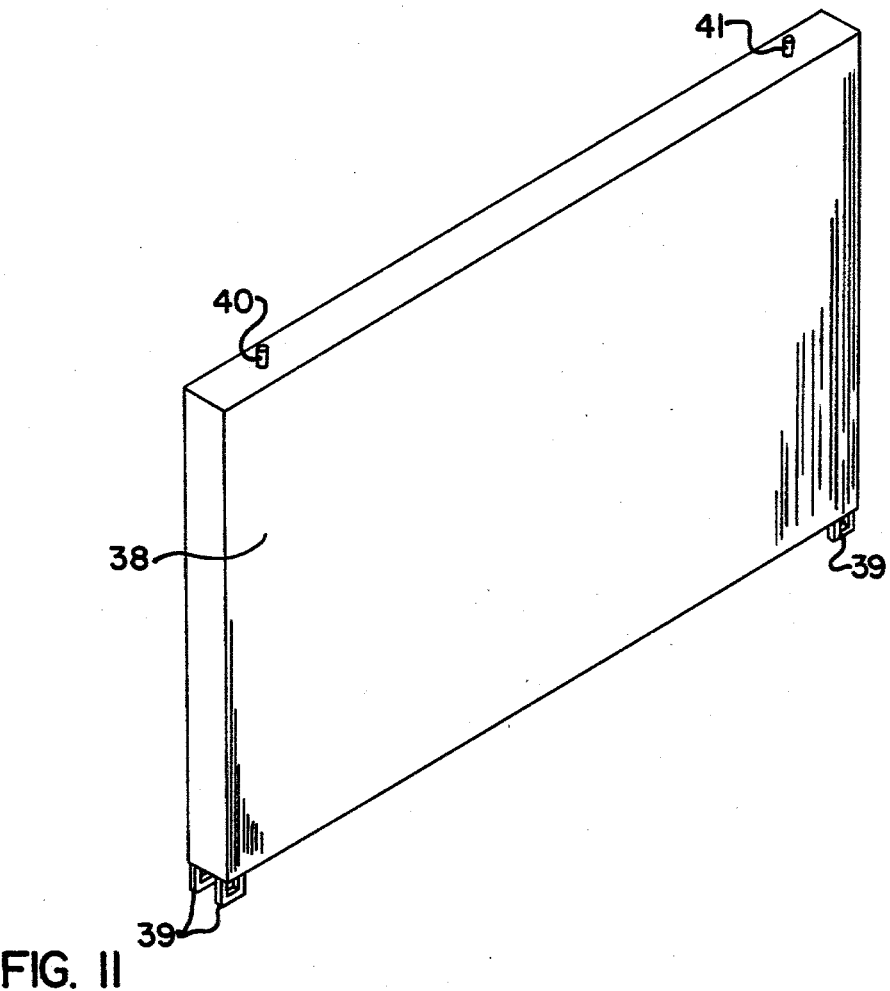
FIG. 11 is a perspective view of a spacer box for use with a storage array as shown in FIG. 10.

FIG. 10 shows a water pool 10 having a reserved space 37 along one edge. The reserved space 37 may be a perimeter space or may be a void space in which apparatus is mounted for handling spent fuel rod containers under water. The storage rack 15 occupies less than all of the cross-sectional area of the water pool 10. In this embodiment, a large spacer box may be secured above the space 37, for example, a spacer box 38 as shown in FIG. 11. The spacer box 38 has brackets 39 at its base for connection to a structure in the base of the water pool 10, e.g., to a frame secured to the side walls or the floor of the water pool 10 or to the storage rack 15. Preferably the spacer box 38 has an air inlet 40 and a water outlet 41 as described in connection with FIGS. 3, 4 (elements 21, 22). A typical spacer box 38 might fill the vertical distance between the storage rack 15 and the water shield 17 at the top of the water pool. Thus a height of perhaps 25 feet, a length of 39 feet and a width of 2.5 feet is feasible. That described spacer box, filled with gas such as air, displaces a volume of about 2,400 cubic feet of water corresponding to a weight of about 150,000 pounds. An accompanying buoyant force of about 150,000 pounds will be applied upwardly to offset the apparent load which is otherwise applied to the floor of the water pool.

Thus the spacer box not only displaces its volume of water which is removed from the water pool and thereby reduces the applied load derived from the water in the pool, but also provides buoyancy which offsets the load applied to the floor of the water pool from the stored contents.

In addition to reducing the deadweight load which is applied to the floor 14 of the deep water pool 10, the present invention has still further unexpected benefit. After a number of the buoyant enclosed spacer boxes 18 have been introduced into the water 16, it will be observed that the centroid of the contents of the deep water pool 10 has been significantly lowered below the level where the centroid would occur in the absence of such buoyant enclosed spacer boxes. By lowering the centroid within the deep water pool, there is an effective lowering of the moment arm of the contents of the deep water pool 10 with the net result that there is a significant reduction in the total moment of the pool contents with respect to the vertical side walls 11. This lowering of the moment applied to the vertical side walls 11 can be a significant factor in the event of seismic stresses which may be applied to the region where the water pool 10 is located.

I claim:

1. In a nuclear fuel rod storage system having a water pool and a spacer box for use in the storage of spent nuclear fuel rod containers in the water pool, said system comprising:
    a spacer box including an elongated hollow box;
    means at one end of said hollow box for securing thereof to a spent nuclear fuel rod container, said hollow box and said container located within the water pool at a submerged location;
    first means for introducing a buoyant medium into the interior of said hollow box;
    second means for withdrawing water from the interior of said hollow box; and
    means for draining water from the water pool in response to a displacement of water by the buoyant medium in said hollow box.

2. A method for reducing the apparent dead weight load of spent nuclear fuel rod containers on the floor of a water pool which is used for the storage of such spent fuel rod containers comprisng:
    securing an elongated gas-filled spacer box to at least one of said containers such that said spacer box is maintained beneath the upper water level of the water pool, and draining water from the water pool whereby the buoyancy of the spacer box within the water pool reduces the load imposed directly by said one container on the floor of the water pool.

3. The method of claim 2 wherein the said elongated spacer box is secured to and positioned above a single container for spent fuel rods.

4. The method of claim 2 wherein the said elongated spacer box is secured to and positioned above a cluster of containers for spent fuel rods.

5. The method of claim 2 wherein the said elongated spacer box is positioned above a void space in the water pool in which there are no spent fuel rods.

6. The method of claim 5 wherein the said elongated spacer box is positioned along a perimeter of the water pool between a storage rack for spent nuclear fuel rods and a side wall of the said water pool.

7. A method for increasing the storage capacity of spent nuclear fuel rods in a water pool without a corresponding proportional increase in the dead weight load transmitted to the floor of the water pool containment which comprises:

compacting spent nuclear fuel rods from nuclear fuel rod containers into nuclear fuel rods canister means wherein the packing density of the spent nuclear fuel rods is increased; introducing the filled canister means into a nuclear fuel storage rack which is supported on the base of said water pool; maintaining in the said water pool below the upper water surface thereof an elongated fluid-filled spacer box; securing the said elongated spacer box to said canister means or said rack located at a submerged level within the water pool; introducing gas into the said spacer box to displace the fluid therefrom and thereby buoy said spacer box within the water pool; and displacing a volume of water from the water pool corresponding to the volume of water displaced by submerging the fluid-filled spacer box to reduce the dead weight load on the floor of the water pool.

8. A storage unit for spent nuclear fuel rods in a water pool, said storage unit comprising a bottom chamber adapted to be supported by the floor of such a water pool for receiving compacted spent nuclear fuel rods; and a buoyant upper chamber maintained beneath a predetermined depth of water in the pool by connection to said bottom chamber for displacing water from the pool to reduce the weight on the water pool floor by the weight of the volume of water displaced from the pool corresponding to the volume of the buoyant upper chamber.

9. The storage unit of claim 8 wherein the said buoyant upper chamber comprises a spacer box and the said bottom chamber comprises a canister, distinct from but secured to the said spacer box.

10. The storage unit of claim 9 wherein the said spacer box is rigidly secured to the said canister.

11. The storage unit of claim 9 wherein the said spacer box is secured to the said canister by connection means which permit the said spacer box to move relative to the said canister.

12. The storage unit of claim 9 wherein the said spacer box is submerged in the water pool adjacent the surface of the water pool and is connected to the said canister which is supported on the floor of the said water pool.

13. The storage unit of claim 11 wherein the said connection means comprises a rigid ball-and-socket joint.

14. The storage unit of claim 11 wherein the said connection means comprises a cable or chain.

15. The storage unit of claim 24 wherein the said rigid ball-and-socket joint includes frictional pads engaged with the spherical surface of the ball to absorb energy when the spacer box moves relative to the canister.

16. The storage unit of claim 8 wherein the said buoyant upper chamber and the said bottom chamber comprise a common vessel wherein the upper portion is filled with gas to provide buoyancy to the upper portion of the chamber.

17. The method of reducing the effect of seismic load or geological or explosive stresses transmitted to an object including nuclear fuel rods in a container submerged in a water pool, said method comprising arranging such object within such a pool for direct physical engagement with the floor thereof;
allowing water to drain from the pool due to displacement of water by positioning a buoyant spacer box below the upper water surface of said pool;
securing said object to the buoyant spacer box; and
allowing the spacer box and said submerged object to move in the pool in response to said stresses while partially supporting said object by the buoyant force on said spacer box beneath the upper water surface of the pool.

* * * * *